US008289385B2

(12) United States Patent
Olsson et al.

(10) Patent No.: US 8,289,385 B2

(45) Date of Patent: Oct. 16, 2012

(54) PUSH-CABLE FOR PIPE INSPECTION SYSTEM

(75) Inventors: Mark S. Olsson, La Jolla, CA (US); Eric M. Chapman, Santee, CA (US)

(73) Assignee: SeekTech, Inc., San Diego, CA (US)

( * ) Notice: Subject to any disclaimer, the term of this patent is extended or adjusted under 35 U.S.C. 154(b) by 869 days.

(21) Appl. No.: 12/371,540

(22) Filed: Feb. 13, 2009

(65) Prior Publication Data

US 2010/0208055 A1 Aug. 19, 2010

(51) Int. Cl.
*H04N 7/18* (2006.01)

(52) U.S. Cl. .......................................... 348/82; 174/107

(58) Field of Classification Search .............. 174/117 R, 174/107; 385/100, 107, 13, 48, 95, 101; 74/490.05; 606/130; 138/125; 505/110; 348/82

See application file for complete search history.

(56) References Cited

U.S. PATENT DOCUMENTS

| | | | | |
|---|---|---|---|---|
| 3,764,779 | A | 10/1973 | Kadoya et al. | 219/201 |
| 3,980,808 | A | 9/1976 | Kikuchi et al. | 174/110 |
| 4,557,560 | A * | 12/1985 | Bohannon et al. | 385/107 |
| 5,457,288 | A * | 10/1995 | Olsson | 174/117 R |
| 5,939,679 | A | 8/1999 | Olsson | 174/113 |
| 2003/0021557 | A1 * | 1/2003 | Eichelberger et al. | 385/101 |
| 2003/0075228 | A1 * | 4/2003 | Tippett | 138/125 |
| 2004/0109650 | A1 * | 6/2004 | Kim et al. | 385/100 |
| 2008/0177284 | A1 * | 7/2008 | Lee et al. | 606/130 |
| 2008/0194411 | A1 * | 8/2008 | Folts et al. | 505/110 |
| 2009/0003778 | A1 * | 1/2009 | Elkins et al. | 385/95 |
| 2009/0095112 | A1 * | 4/2009 | Buckingham et al. | 74/490.05 |
| 2010/0166370 | A1 * | 7/2010 | Cody et al. | 385/48 |
| 2010/0254650 | A1 * | 10/2010 | Rambow | 385/13 |

FOREIGN PATENT DOCUMENTS

| | | |
|---|---|---|
| GB | 2 172 079 A | 9/1986 |

OTHER PUBLICATIONS

PCT/IB2010/000310—Communication Relating to the Results of the Partial International Search (2pgs).

* cited by examiner

*Primary Examiner* — Le H Luu

(74) *Attorney, Agent, or Firm* — Steven C. Tietsworth

(57) ABSTRACT

In accordance with the present invention a push-cable comprises a central core including a least one conductor, a plurality of non-metallic resilient flexible stiffness members surrounding the core, and a layer of sheathing surrounding the stiffness members.

29 Claims, 18 Drawing Sheets

PUSH-CABLE FOR PIPE INSPECTION SYSTEM

CROSS-REFERENCE TO RELATED APPLICATION AND PATENT

This application is related by common authorship and field of application to U.S. Pat. No. 5,939,679 of Aug. 17, 1999, Olsson, entitled VIDEO PUSH-CABLE, and patent application Ser. No. 11,679,092 of 26 Feb. 2007, Olsson, entitled LIGHTWEIGHT SEWER CABLE, both of which are here incorporated by reference.

BACKGROUND

1. Field of the Invention

The present invention relates generally to systems for inspecting the interior of pipes and other conduits or voids, and more specifically to the design of push-cables used to move an inspection camera into pipes, conduits or other hard-to-access areas.

2. Description of the Related Art

There are many situations where it is desirable to internally inspect long lengths of pipe that are already in place, either underground, in a building, or underwater. For example, sewer and drain pipes frequently must be internally inspected to diagnose any existing problems and to determine if there are any breaks causing leakage or obstructions impairing the free flow of waste. It is also important to internally inspect steam pipes, heat exchanger pipes, water pipes, gas pipes, electrical conduits, and fiber optic conduits for similar reasons. Frequently, pipes that are to be internally inspected have an internal diameter of six inches or less, and these pipes may make sharp turns. It is sometimes necessary to internally inspect several hundred feet of pipe. The capability to inspect smaller diameters such as bathroom drains and small voids such as the interior of walls or other construction areas is highly desirable and is constrained by the performance and specifications of the push-cable used as well as the design of the camera head and its connections.

Video pipe inspection systems have been developed that include a video camera head that is forced down the pipe to display the pipe interior on a video display. The inspection is commonly recorded using a video recorder (VCR) or digital video recorder (DVR). Conventional video pipe inspection systems have included a semi-rigid push-cable that provides an electromechanical connection between the ruggedized camera head that encloses and protects the video camera and a rotatable push reel used to pay out cable and force the camera head down the pipe. The inspection push-cable must be specially designed to be flexible enough to make tight turns yet rigid enough to be pushed hundreds of feet down small diameter pipe. The push-cable needs to incorporate electrically conductive cable having the proper conductors and impedance for conveying the NTSC or other video signals to the video display unit and for coupling to external power and ground conductors. Examples of suitable video push-cables are disclosed in U.S. Pat. No. 5,457,288 issued Oct. 10, 1995 to Mark S. Olsson and U.S. Pat. No. 5,808,239 issued Sep. 15, 1998, to Mark S. Olsson. The video camera head design and the manner in which it is connected to the distal end of the video push-cable are important to the performance and reliability of a video pipe inspection system. These structures must be rugged, yet the camera head must be compact and its manner of connection to the video push-cable flexible enough to bend through tight turns. Existing designs typically require an electrical termination at the rear end of a protective flexible spring extending from the camera head and shielding parts from abrasion while also serving to lead the push-cable around curves in the pipe or other space under inspection.

Conventional push-cables used for such inspections are often helically wrapped with filler rods and conductors wound around a semi-rigid central push-rod. The central push-rod is typically a high-strength rod of composite material, which provides the stiffness necessary to push the cable a considerable distance. The limitations of flexure of the central push-rod makes the push-cable suitable for traversing turns on the order of ninety degrees in drain pipes of a diameter on the order of four to six inches. As the pipe diameter decreases or the angle of required turns increases, the central push-rod reaches the limits of its performance. A conventional push-cable with a semi-rigid central push-rod also has the drawback of a single mode of failure in the central push-rod if it is over-stressed by too narrow a bend, for example. A need is strongly felt in the field for a push-cable capable of robustly managing tighter turns and smaller diameter pipes and openings.

SUMMARY

In accordance with the present invention a push-cable comprises a central core including a least one conductor, a plurality of non-metallic resilient flexible stiffness members surrounding the core, and a layer of sheathing surrounding the stiffness members.

DETAILED DESCRIPTION

Figure 1:
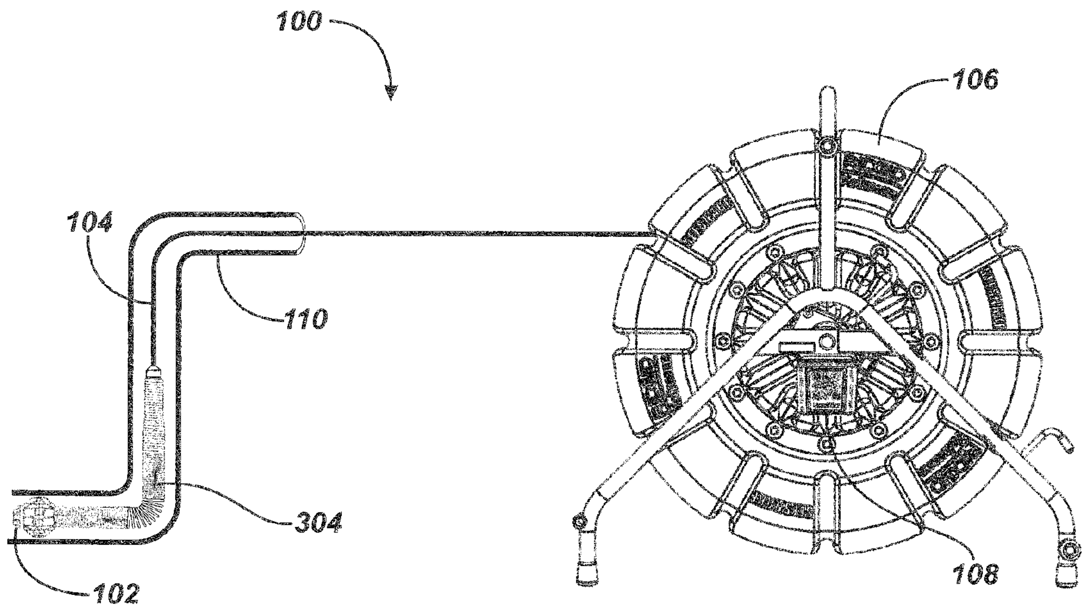
FIG. 1 is a diagrammatic illustration of an exemplary inspection system using the preferred embodiment of the present invention.

The present invention also provides an innovative high-performance push-cable with the advantage, compared to existing designs, of a smaller diameter and a more flexible construction with a significantly reduced bend radius, more suitable to miniaturized inspection cameras and adaptable to more varied environments including smaller pipes and other voids, conduits or spaces requiring more flexibility to access.

The present invention also provides an inspection push-cable that does not require electrical termination at the rear of the protective spring surrounding the camera head but allows the inner conductors to plug directly into the camera head through spring-loaded pins contacting conductive pads within the camera head. This innovation results in improved ease of construction and improved bend-radius during inspections.

The present invention provides a novel camera head for use in pipe inspection systems with innovations in design which improve heat dissipation, simplify the camera mounting, improve the electrical connections and produce a shorter, more rugged, and more compact camera structure. A transmitting sonde coil can be built into the camera head allowing the camera head to be located while traversing a pipe.

The present invention further provides an innovative structure for connecting a camera head to a push-rod assembly by directly mounting the image sensor on a circuit board directly in contact with the spring-loaded pins of the cable connectors, enabling a shorter, more flexible and more rugged camera head construction. This constriction has shown itself to be more shock-resistant and impact-resistant, and to dissipate ambient heat more effectively than prior art designs. The LEDs for the camera head are mounted within a screw-on bezel and the electrical connections are maintained by spring-mounted pins contacting annular contact rings in a novel design. This design allows the bezel to be easily removed for service and improves optical efficiency. By mounting the LEDs well forward in the camera head the present invention provides an improved illumination pattern over the camera's field of view. The innovation of mounting the LEDs into a removable screw-on bezel also improves heat dissipation in the camera system by providing direct thermal contact with the bezel.

The present inventions further provides an innovative design for a camera pipe guide that is used to stabilize the camera head during its travel down the pipe, and keep it off the bottom of the pipe to provide a clearer view of the interior of the pipe. This invention reduces the construction of the pipe guide to only three types of parts thereby reducing manufacturing and assembly costs.

The improvements described herein may be implemented in a video pipe-inspection system of the type disclosed in U.S. Pat. No. 5,939,679, for example. In the preferred embodiment of the present invention the external insulated wires and shielding often seen in prior art are omitted, as is the central resilient push-rod. A center electrical core is instead wrapped with a helix of very small-diameter stiffness members such as relatively small diameter fiberglass rods. Because smaller rods are used in this design, the bend radius of the overall cable is significantly reduced, and because multiple rods are used, a single failure in one will not mean a failure in the whole push-cable. This design lends itself to applications for pipe inspection systems where the pipe, conduit or other space of interest may be relatively narrow.

Referring to FIG. 1, a pipe inspection system 100 includes a camera head 102 at one end of a push-cable 104 that can be payed out from a storage reel 106. The storage reel 106 has an electronic module 108 attached or built into it, to provide display and count capabilities. Examples of constructions for the camera head 102 are disclosed in U.S. Pat. No. 6,831,679 entitled VIDEO CAMERA HEAD WITH THERMAL FEEDBACK CONTROL, granted to Mark S. Olsson et al. on Dec. 14, 2004, and in U.S. patent application Ser. No. 10/858,628 entitled SELF-LEVELING CAMERA HEAD, of Mark S. Olsson filed Jun. 1, 2004, the entire disclosures of which are hereby incorporated by reference. Examples of a storage reel and associated electronic module are disclosed in U.S. Pat. No. 6,545,704 entitled VIDEO PIPE INSPECTION DISTANCE MEASURING SYSTEM, granted to Mark S. Olsson et al. On Apr. 8, 2003, the entire disclosure of which is hereby incorporated by reference. Utilizing its on-board circuitry, the camera head 102 transmits image information through embedded conductors such as wires in the central core of push-cable 104 as it is inserted into a pipe 110.

Figure 7A:
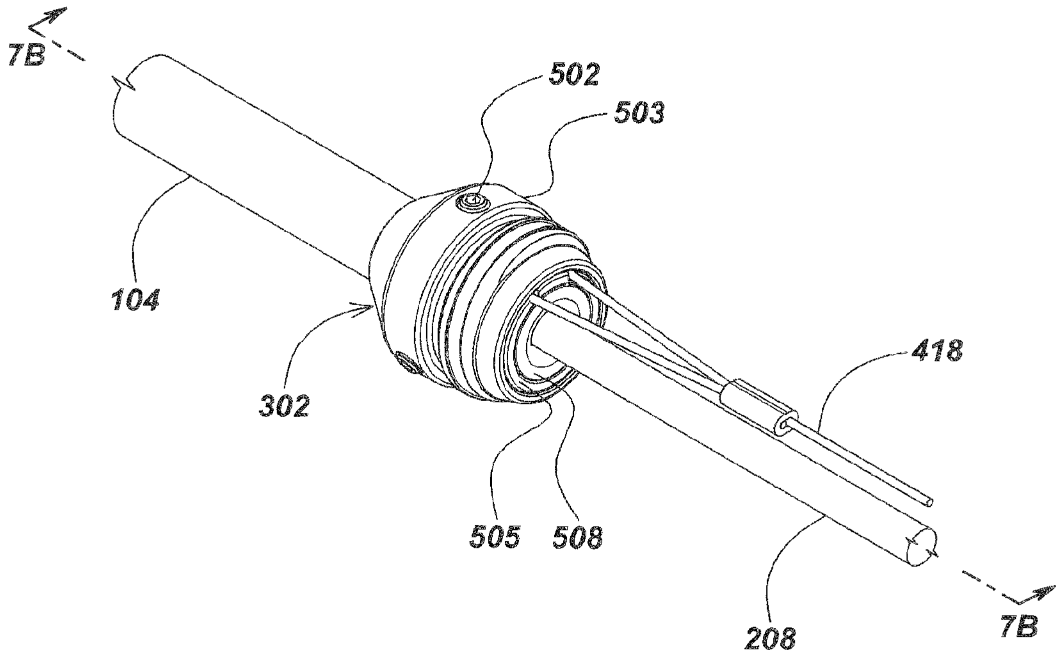
FIG. 7A is an isometric view of the termination adaptor used at the junction between the push-cable and the protective spring at the proximal end of the spring.
Figure 7B:
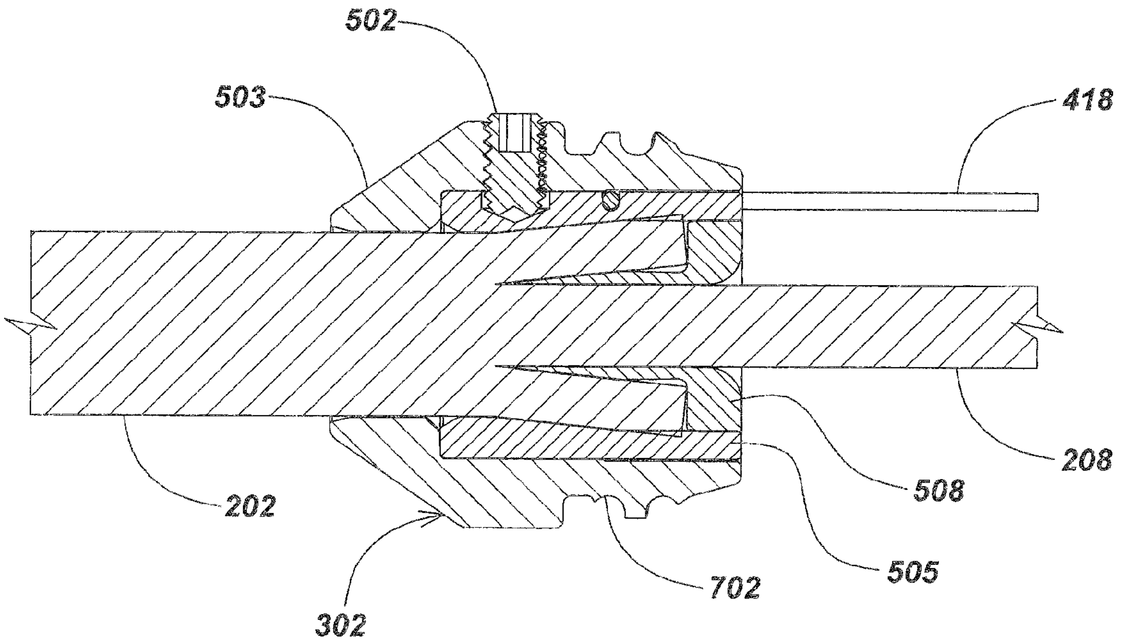
FIG. 7B is a section view taken along lines 7B-7B of FIG. 7A.

Push-cable 104 includes a central polymer monofilament 220 (FIG. 2A) that is surrounded by a plurality of conductors 210, 212, 214, 216, 218, each comprised of 28AWG insulated wire and having an external diameter of 0.03 inches, for example. The conductors 210 etc. are sheathed in a 90 A durometer insulative polyurethane jacket 207, 0.035 inches thick, for example. The insulated wires are helically wrapped around the monofilament 220. The central core 208 (FIGS. 7A and 7B) of the push-cable 104 thus comprises the monofilament 220 (FIG. 2A), conductors 210, 212, 214, 216 and 218 and the surrounding jacket 207. The central core 208 is surrounded by a plurality of non-metallic stiffness members in the form of twelve helically laid resilient flexible rods 206, each of which is 0.03 inches in diameter for example. The rods 206 are preferably made of fiberglass and sheathed with a flexible layer of polymer fibrous braid 204 made of an insulative material such as Vectran™. The entire assembly has an outer resin jacket 202 of 0.35 inches thickness made of an insulative material such as DuPont™ Surlyn® for example. In an alternative embodiment the helical rods 206 may be of carbon-fiber or other suitable composite material. Other materials may be used for the outer jacket 202 such as high-grade urethane, DuPont Hytrel™ polyester elastomer, polypropylene, or similar material. Other forms of stiffness members may be used besides those having a round cross-section, including stiffness members with a pie-shaped cross-section and stiffness members with a rectangular cross-section.

Figure 2A:
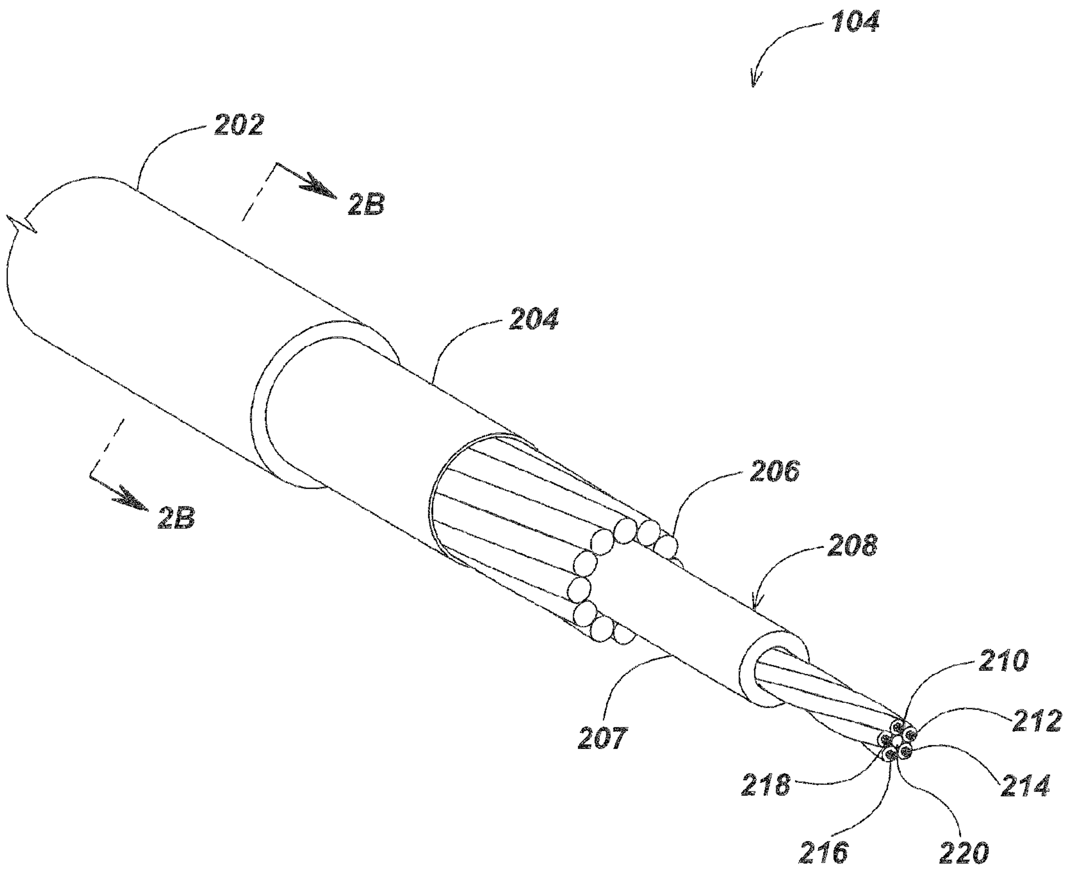
FIG. 2A is an enlarged fragmentary isometric view of the preferred embodiment of the push-cable of the present invention, partially cut away to reveal the central electrical core and the helical surround of small flexible rods around it.
Figure 2B:
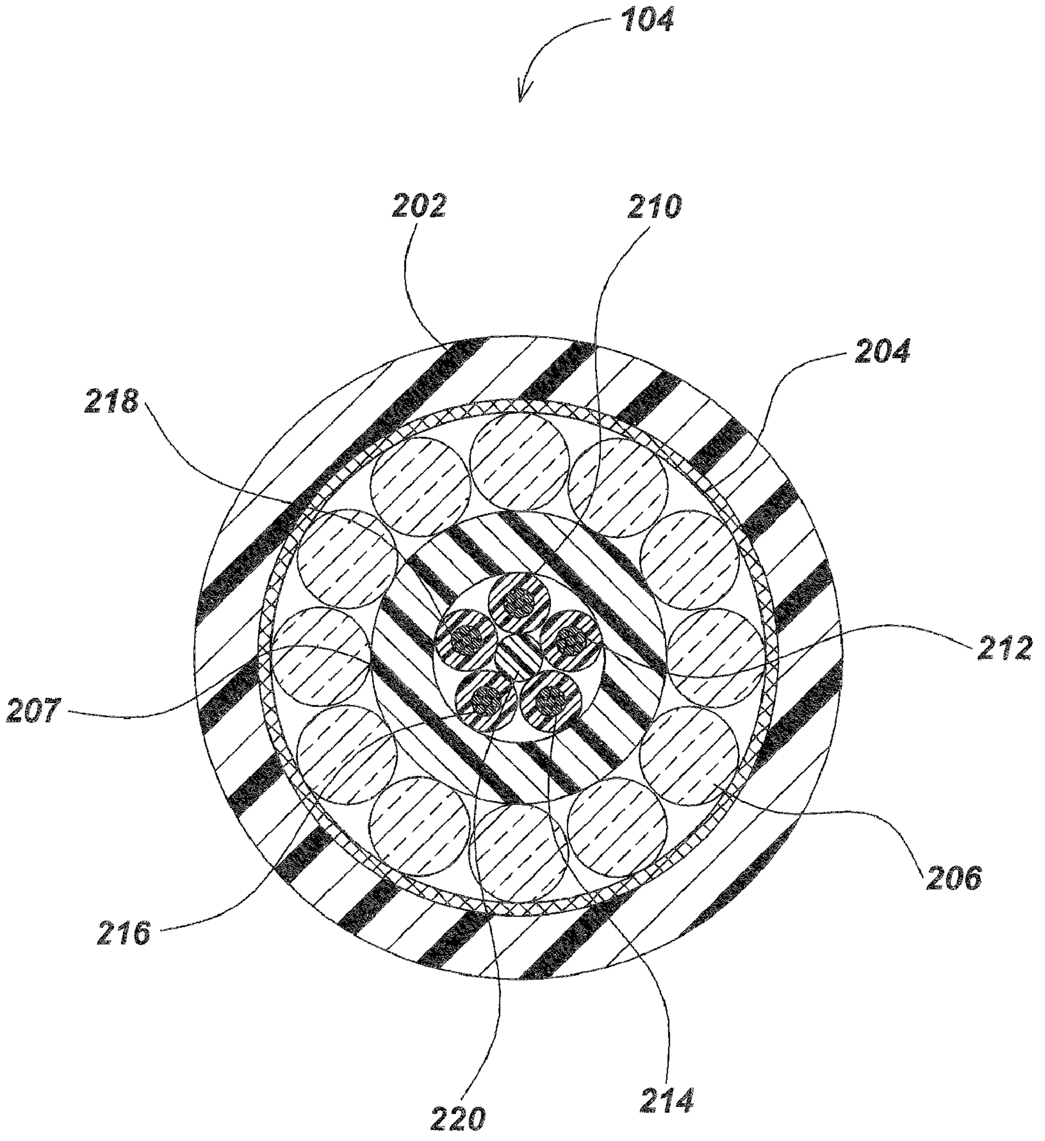
FIG. 2B is an end-view schematic showing the cable construction of the preferred embodiment of the present invention.

The central monofilament 220 is surrounded by the conductors 210, 212, 214, 216, 218 which are in turn covered by the jacket 207. As illustrated in FIG. 2B, helically wound fiberglass rods 206 are placed with a left-hand lay around the central core 208 providing both the necessary stiffness and flexibility for traversing turns in small diameter pipes. The fibrous polymer braid 204 is wrapped around the rods 206, and the outer jacket 202 contains all the other components of the push-cable 104. The conductors 210, 212, 214, 216 and 218 each comprise an insulated wire having a multi-stranded internal metal component.

By using the helical wrap of small-diameter rods 206 around the conductors 210 etc., instead of a central resilience and fiberglass push-rod, greater flexibility is achieved while maintaining sufficient stiffness to operate as a push-cable. In part, the stiffness of the overall construction is controlled by the lay length of the helix of small fiberglass rods 206. In the embodiment of FIGS. 2A and 2B the lay length is approximately six inches. A longer lay length will increase stiffness; however, the optimum lay length will vary for different applications.

Figure 3:
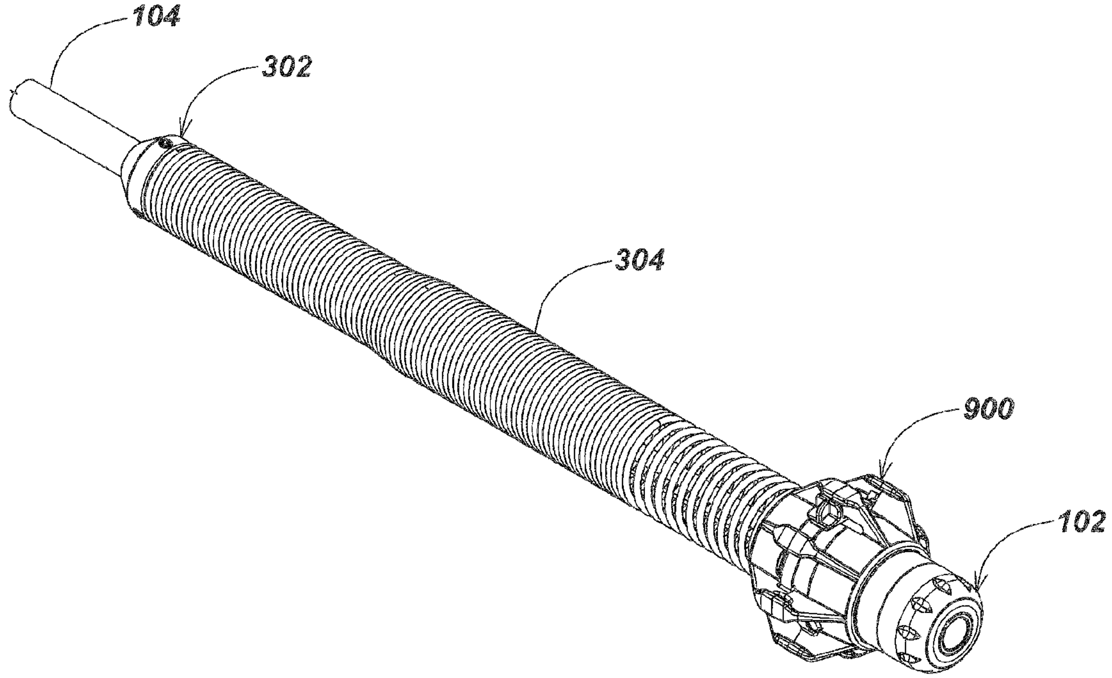
FIG. 3 is an isometric view of part of an exemplary embodiment of a camera head with a protective spring and pipe guide in place.
Figure 9A:
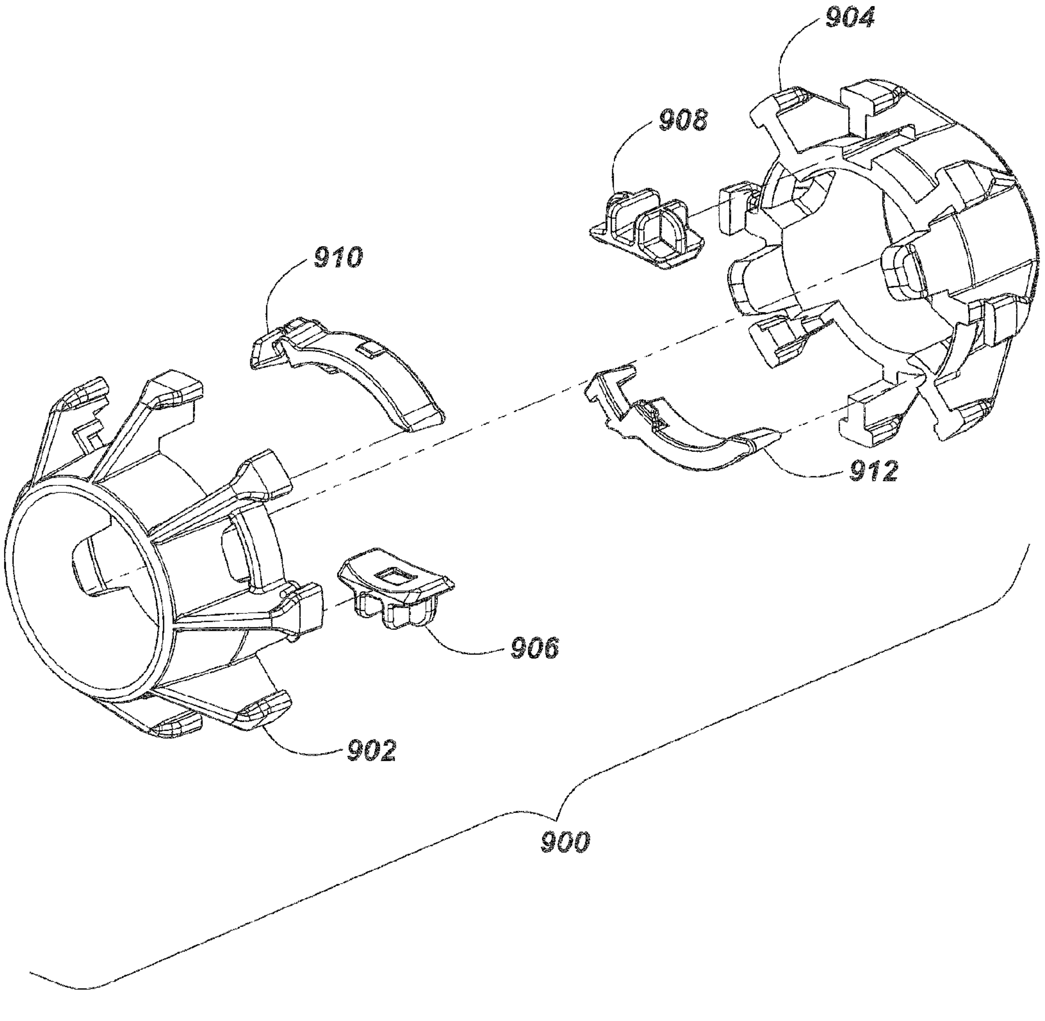
FIG. 9A is an exploded view of the parts of a pipe guide which locks on to the protective spring and helps guide the camera head down a pipe.
Figure 9B:
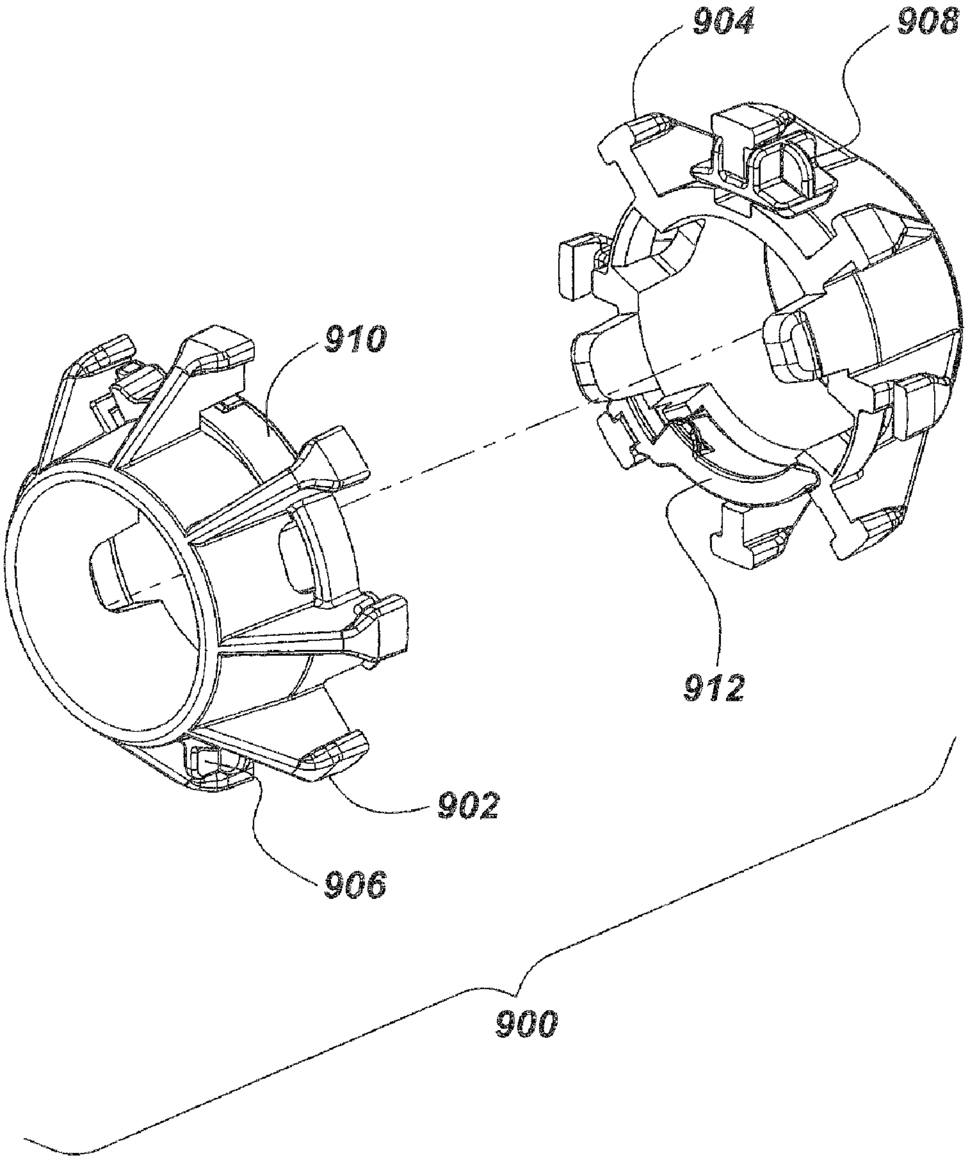
FIG. 9B is an exploded view that illustrates the parts of the pipe guide partially assembled into two complementary halves.
Figure 9C:
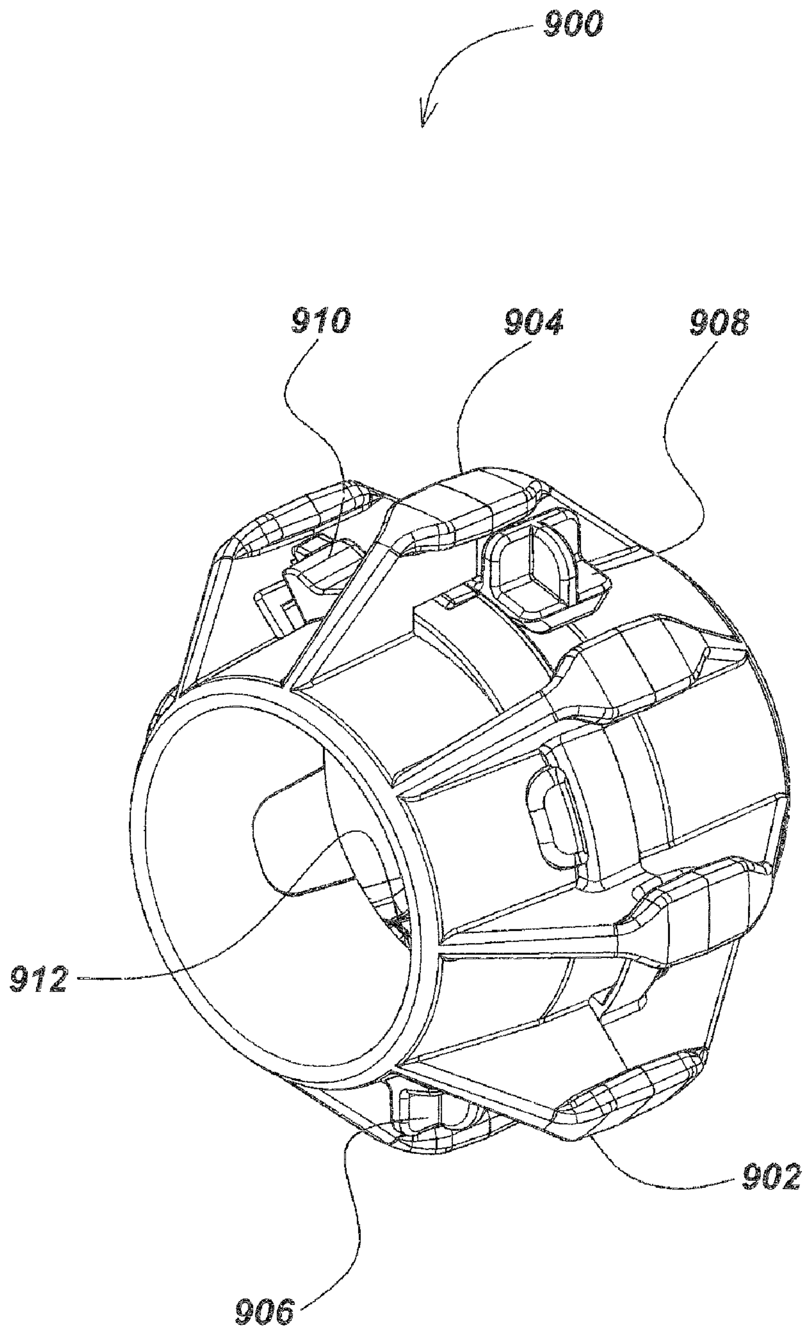
FIG. 9C illustrates the assembled pipe guide.

Turning now to FIG. 3, an elongated stainless steel protective coil spring 304 is used to improve the strength and flexibility of the coupling between the push-cable 104 and the camera head 102. The push-cable 104 is routed through a central aperture in a termination adaptor 302 which is removably fixed to the cable end of the coil spring 304. At the camera end of the coil spring 304, a camera termination assembly 306 (FIG. 4B) couples the end of the central core 208 of the push-cable 104 to the camera head 102. Details of the construction of the camera termination assembly 306 are illustrated in FIGS. 4A, 4B, 4C and 4D. A pipe guide 900 (FIG. 3) surrounds the camera head 102 and serves to properly position the camera head 102 within the pipe 110. Details of the construction of the pipe guide 900 are illustrated in FIGS. 9A, 9B, and 9C.

In the illustrated embodiment of the camera head 102 LEDs 516 (FIG. 5B) are mounted within a cylindrical screw-on camera housing bezel 402, preferably made of metal, and the required electrical connections are maintained by spring-mounted pins that contact annular contact rings on an LED circuit board 426. This allows the camera module 600 (FIG. 6B) to be easily removed for service. Mounting the LEDs 516 well forward in the camera head 102 provides an improved illumination pattern over the camera's field of view. Mounting the LEDs 516 into the removable screw-on bezel 402 also improves heat dissipation in the camera head 102 by providing direct thermal contact with the bezel 402.

Figure 4A:
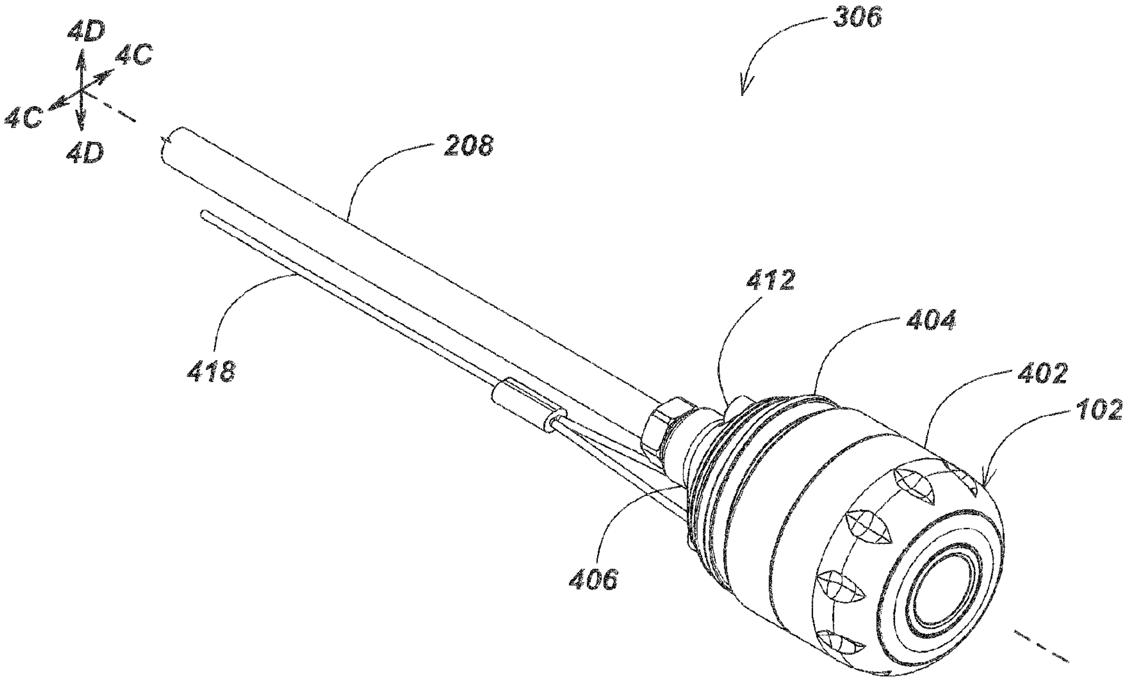
FIG. 4A is an isometric view illustrating the connection of the push-cable of FIGS. 2A and 2B to the camera head.

Turning now to FIG. 4A, the central core 208 comprising the monofilament 220, conductors 210, 212, 214, 216 and 218 and the surrounding jacket 207, enters a connector shell 406, and then passes into a metal camera housing 404. Inside the housing 404, the metal portion of each of the individual conductors, such as 210, is joined to contacts in the camera head 102 through crimping or soldering. The bezel 402 which contains the camera electronics is constructed so that it joins by threaded connection to the housing 404. The connector shell 406 is attached to the housing 404 by three hex-socket-head cap screws 412 (FIG. 4C). The housing 404 is externally male threaded so that the forward end of the coil spring 304 (FIG. 3) can be screwed over the same. A stainless steel safety cable 418 with a crimped-on loop is attached the camera head 102 and allows the camera head 102 to be withdrawn from the pipe 110 under circumstances where it would otherwise be jammed in place.

Figure 4B:
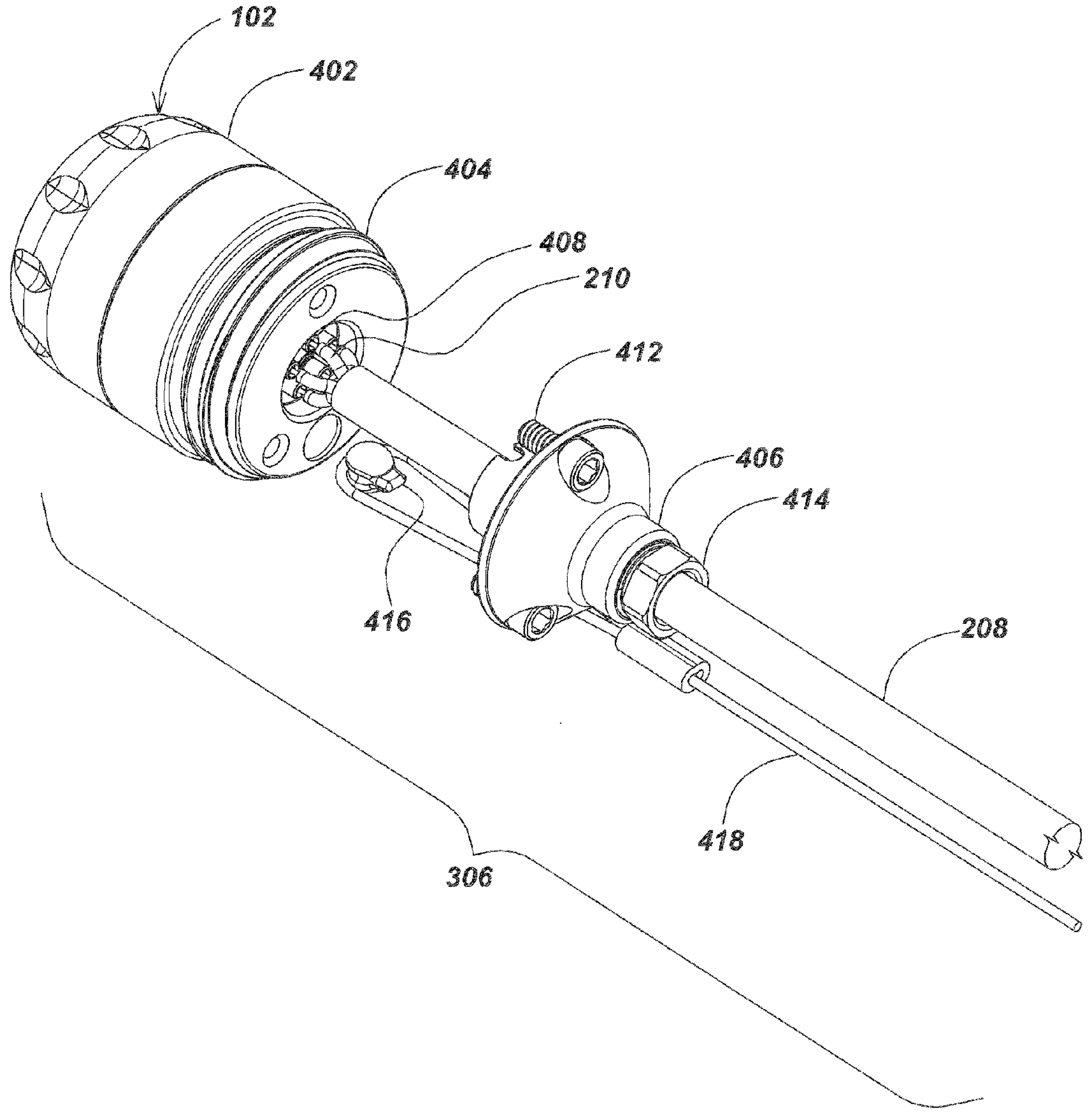
FIG. 4B is a rear view illustrating further details of the partially disassembled connection of the push-cable of FIGS. 2A and 2B to the camera head.
Figure 4C:
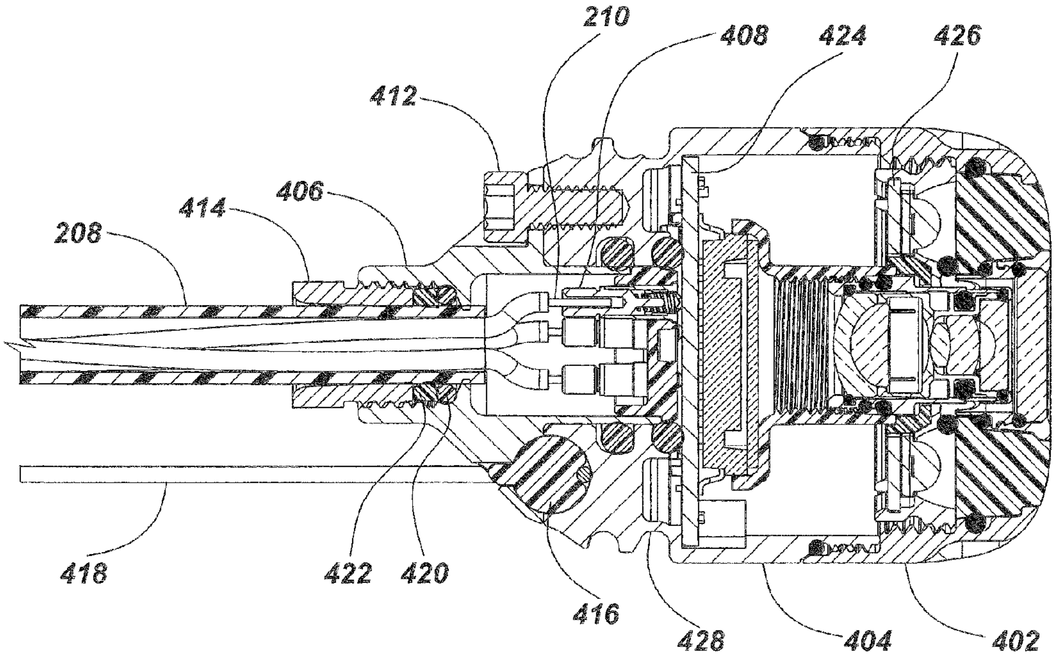
FIG. 4C is a sectional view of the assembled push-cable and camera head taken along lines 4C-4C of FIG. 4A.

Referring to FIG. 4B, the central core 208 of the push-cable 104 passes through a threaded hex-head seal screw 414 which threads into the body of the connector shell 406. A universal O-ring 420 and backup ring 422 (FIG. 4C) are seated around the central core 208 of the push-cable 104 and form a watertight seal when the seal screw 414 is tightened. Within the housing 404 the metal portions of the individual conductors, such as 210, terminate in their crimp or solder connections to a plurality of spring contact pins 408 providing electrical connection to a camera circuit board 424 (FIG. 4C) located within the bezel 402. The spring-loaded pins 408 are particularly designed with rapid-crimp connections eliminating the need for solder cups. The safety cable 418 is attached to the camera head 102 with a grooved ball stop 416 (FIG. 4C). The ball-stop 416 fits in a recess in the housing 404 with the loop in the end of cable 418 seated in a groove around the central body of the ball-stop 416. When the connector shell 406 is secured by the hex-head screws 412, the safety cable 418 is contained in place by the ball-stop 416. Safety cable 418 is a straight section of 1/32" stainless steel wire rope in the preferred embodiment, terminated at each end in a simple loop or eye.

Referring still to FIG. 4C, the conductors of the inner core such as 210 are led through the central opening in the connector shell 406 and the threaded hex-head seal screw 414. The O-ring 420 provides a first seal of the junction of the connector shell 406 and the threaded hex-head seal screw 414. The backup ring 422 enables tightening of seal screw 414 without abrading the O-ring 420. The individual conductive centers of the wires that form the central core 208 are attached by soldering or preferably by crimping to the spring loaded pins 408 which maintain electrical contact with the camera circuit board 424 inside housing 404. Coil spring 304 (FIG. 3) is threaded onto the external threads 428 of the housing 404 to which the connector shell 406 is attached by the use of the hex-socket-head cap screws such as 412. Bezel 402 encloses the LED circuit board 416.

Figure 4D:
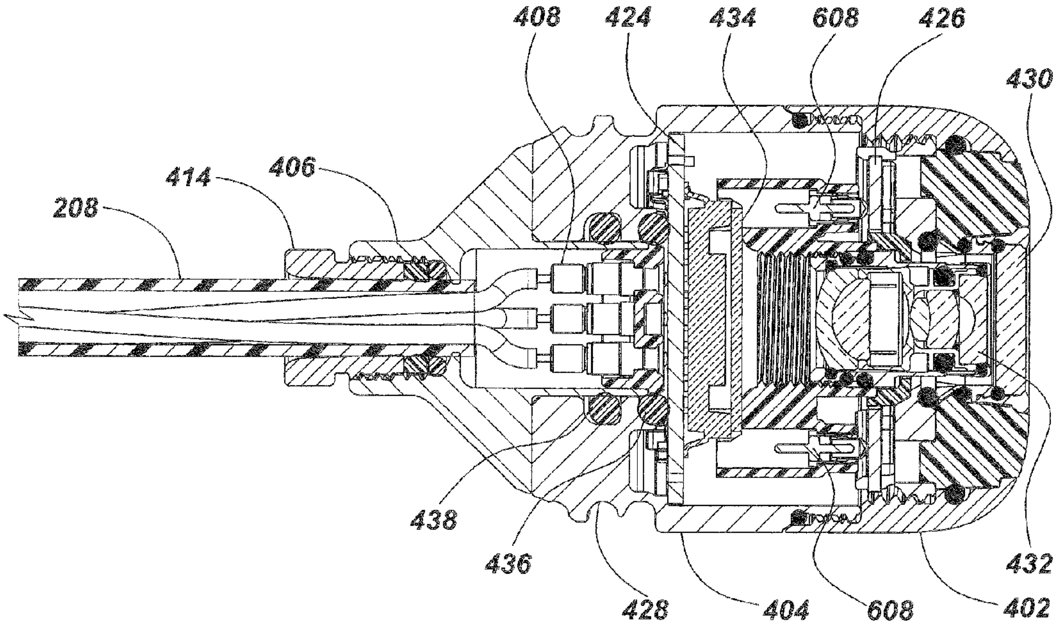
FIG. 4D is a sectional view of the assembled push-cable and camera head taken along lines 4D-4D of FIG. 4A.

Turning now to FIG. 4D, bezel 402 supports a transparent Sapphire window 430 through which the camera views the inside of the pipe. Annular contact rings 502 and 504 (FIG. 5A) on the rear side of the LED circuit board 426 contact spring-loaded POGO-type pins 608 (FIG. 4D). Lens assembly 432 (FIG. 6B) and integrated circuit image sensor 434 (FIG. 6A) are mounted to the camera circuit board 424. The POGO pins 608 transmit electrical power to the LEDs 516 by directly contacting the annular contact rings 502 and 504 on the back of LED circuit board 426. Further details of the camera head 102 are illustrated in FIG. 5B.

Referring to FIG. 4D, an O-ring 436 and O-ring 438 are located within channels machined into the housing 404. O-ring 436 seals against the sealing surface on the back of the camera circuit board 424. The use of dual O-rings in this area of the camera head 102 provides extra protection against the penetration of water. Because the O-ring 436 seals directly against the sealing surface on the back of camera circuit board 424, the camera module 600 (FIG. 6A) is protected from moisture penetration even when disassembled or stored.

Figure 5A:
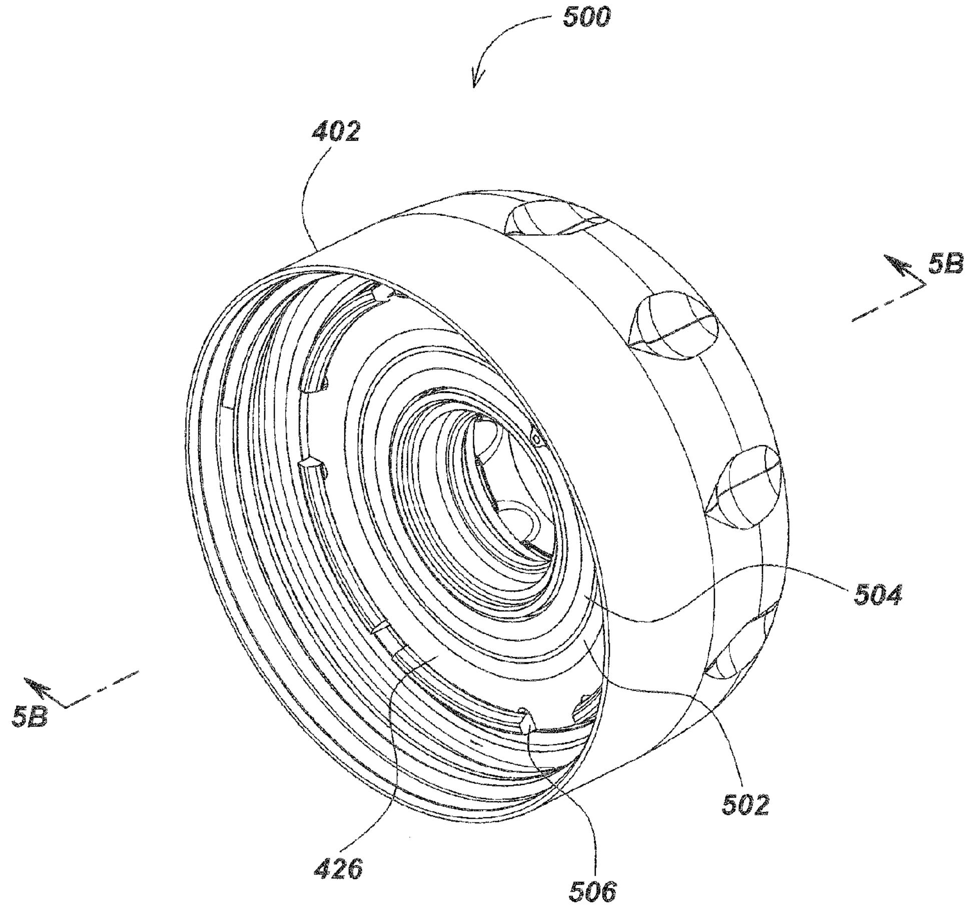
FIG. 5A is a rear perspective view of the camera bezel and LED board illustrating the contact rings within the camera head.

Turning now to FIG. 5A, camera bezel assembly 500 includes the bezel 402 that houses a metal heat ring 506 which conducts heat from LEDs 516 (FIG. 5B) into the bezel 402. The heat ring 506 is designed with tab-like protrusions which fit into gaps in the perimeter of the LED circuit board 426 to retain the LED circuit board 426 and prevent it from rotating. The annular contact rings 502 and 504 provide negative and positive electrical connection, respectively, to the LEDs 516 that are mounted on the forward side of LED circuit board 426. The contact rings 502 and 504 are maintained in electrical contact with the conductors 210 etc. by spring pressure on the pins 608 (FIG. 4D) of the POGO connectors. Forming electrical connections to the LED circuit board 426 inside the bezel 402 allows the LEDs 516 to be hard-mounted to the bezel 402. This provides improved structural strength, significantly better heat dissipation, and ease of assembly. It further allows the front camera bezel assembly to be screwed into place without the risk of twisting wired connections. The use of spring-loaded pins has proven to be highly impact-resistant.

Figure 5B:
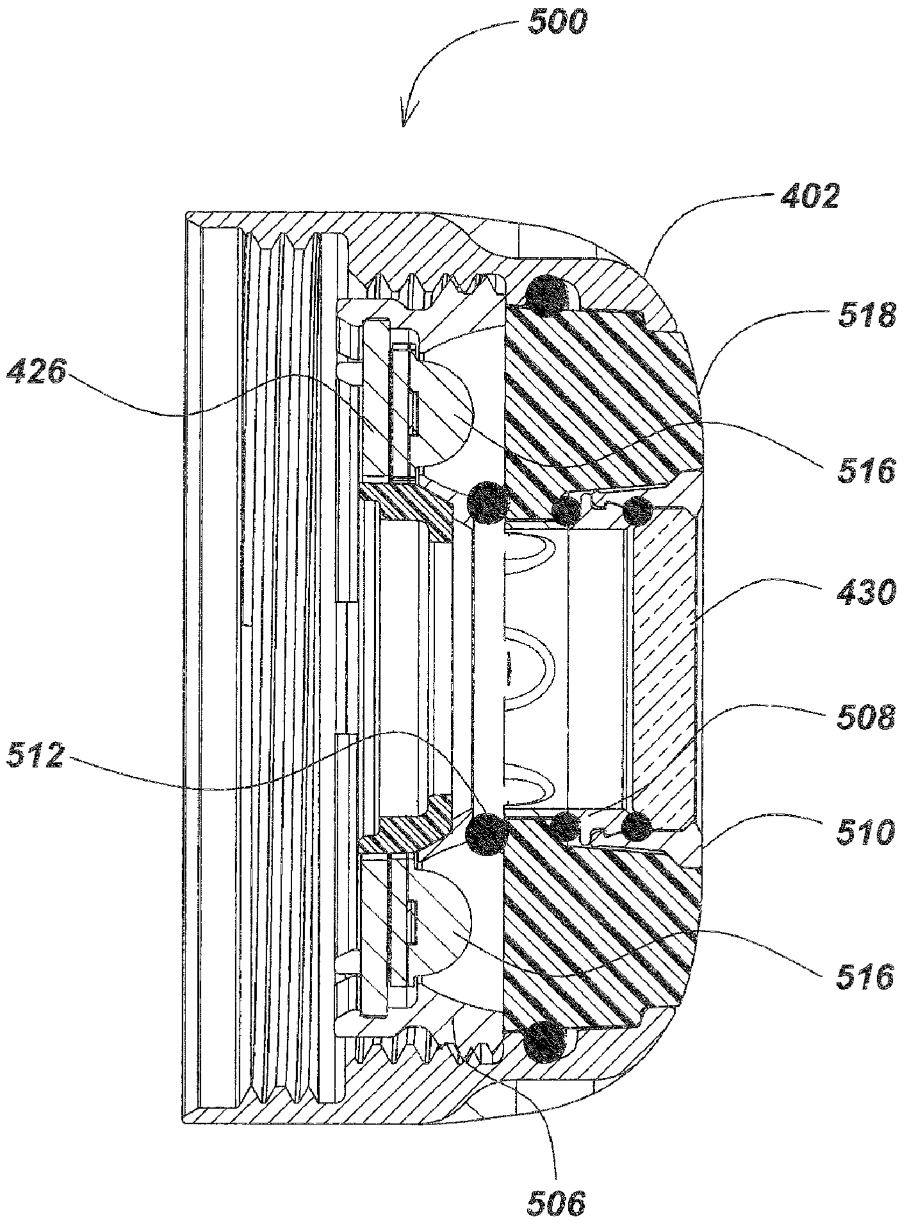
FIG. 5B is a section view of the camera bezel taken along lines 5B-5B of FIG. 5A.
Figure 6A:
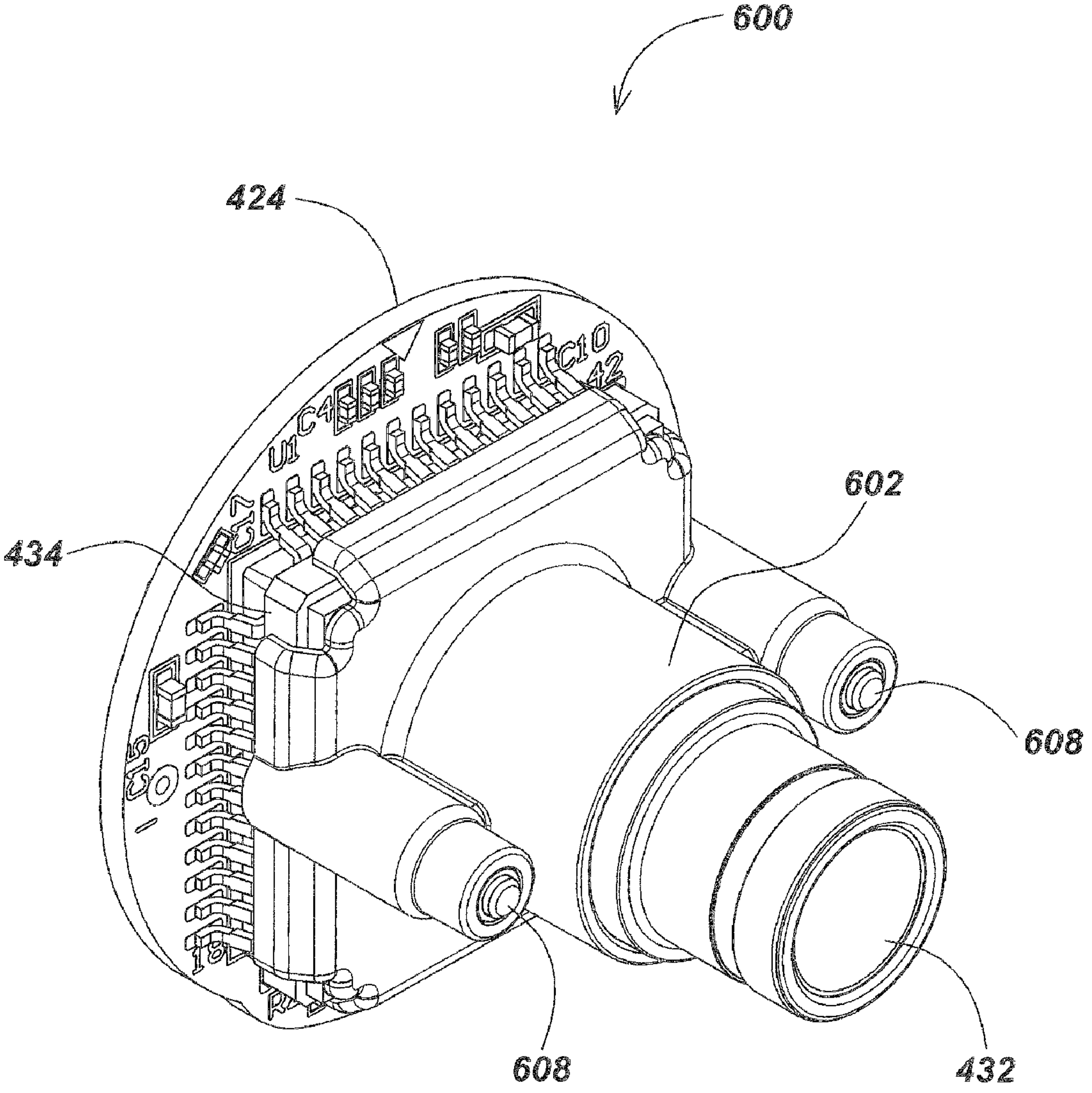
FIG. 6A is a front perspective view of the camera module and lens assembly.
Figure 6B:
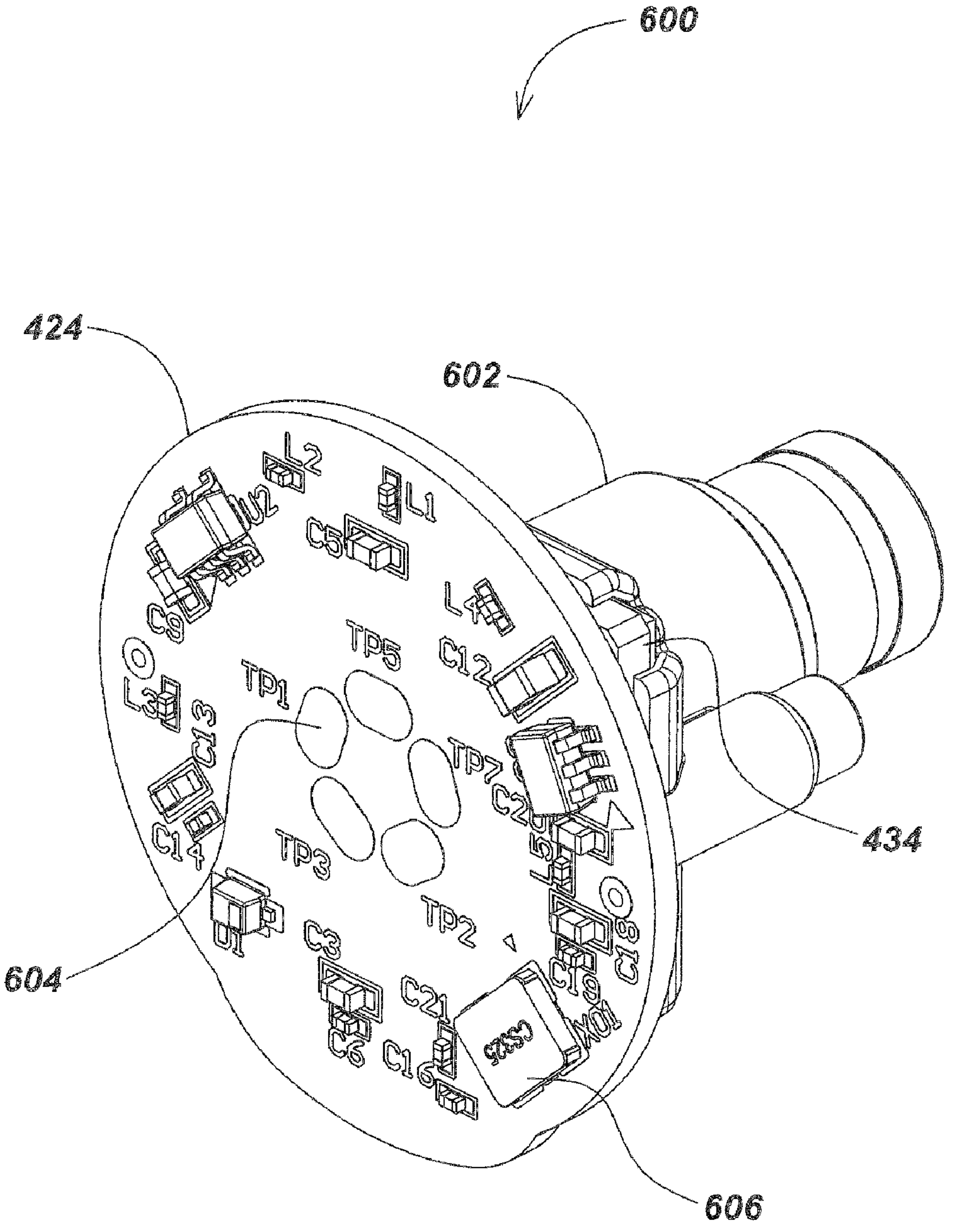
FIG. 6B is a rear perspective of the camera module showing the contacts, sealing surface and components on the rear of the camera board.

Referring to FIG. 5B, the window 430 is retained in position by a retainer 510. A window tube 508, sits forward of a lens assembly 602 (FIG. 6A). A light-blocking O-ring 512 is seated at the base of window tube 508. The LED circuit board 426 supports the plurality of LEDs 516. Light emitted from LEDs 516 is transmitted through a transparent plastic LED window 518. The heat ring 506 conducts heat away from the camera module 600, and is in contact with the internal threads of bezel 402 thermally coupling the bezel 402 to the housing 404 (FIG. 4B) to provide more efficient heat transfer.

Referring to FIG. 6A, the camera module 600 comprises the camera circuit board 424, the lens assembly 602 and an integrated circuit image sensor 434 which is mounted on the camera circuit board 424. Two spring-loaded POGO-type pins 608 provide electrical contact to the annular rings 502 and 504 (FIG. 5A) on the back plane of the LED circuit board 426 (FIG. 5A). Lens assembly 432 press fits in position in the lens assembly 602. The use of spring contacts against the annular contact rings allows the bezel 402 to be rotated into position during assembly and screwed off for maintenance without running the risk of damaging the wire connections to the central core 208 of the push-cable 104.

The rear side of the camera circuit board 424 includes five conductive contact pads 604 (FIG. 6B) that align with the spring-loaded pins 408 (FIG. 4C). The use of the spring-loaded pins 408 enables the camera head 102 to be shorter in axial length and more impact resistant. In addition to the contact pads 604, the camera circuit board 424 supports numerous electronic components making up the camera electronics, including an integrated circuit 606. The image sensor 434 (FIG. 6B) is mounted on the forward side of the camera circuit board 424 and the camera assembly 602 and lens assembly 432 (FIG. 6A) are mounted to the image sensor 434.

Termination adaptor 302 (FIGS. 7A and 7B) joins the push-cable 104 with the central core 208 of the push-cable. In the illustrated embodiment of the pipe inspection system 100 no electrical termination is necessary at this location, as the conductors 210 etc. of push-cable 104 pass directly through to the camera head 102 without a separate termination, as illustrated in FIGS. 4A, 4B, and 4C. The push-cable 104 enters a spring shell 503, and a press shell 505. Spring shell 503 is secured to the press shell 505 by three set screws such as 502 equidistantly located around the circumference of the spring shell 503. The outer jacket 202 of the push-cable 104 and the helical array of fiberglass rods 206 (FIG. 2) are cut away in the vicinity of the interior of the spring shell 503. The press shell 505 (FIGS. 7A and 7B) seats around push-cable 104, and a press ferrule 508, is seated around the central core 208 of the push-cable 104. The taper of the press-ferrule 508 prevents the flared portion of the push-cable 104 from pulling out of the press shell 505 when the set screws 502 are threaded into the spring shell 503 and tightened against the press shell 505. External threads 702 formed in the outer surface of the spring shell 504 threadably receive the rear end of the coil spring 304 (FIG. 3). The rear end of the safety cable 418 is anchored within the termination adaptor 302.

The push-cable 104 enters the spring shell 503 and the press shell 505, and engages the press ferrule 508. Epoxy or other suitable adhesive may be used to secure these components together, making the connection more robust. The safety cable 418 is anchored by a loop or eye at the rear end that is located in a groove in the press shell 505, which locks the safety cable 418 in place when the press shell 505 is secured within the spring shell 503 by the set screws 502.

A sonde including a transmitting coil 802 and metallic core 804 (FIG. 8) may be built into the camera head 102 of the pipe inspection system 100. Signals from a suitable drive circuit may be supplied to the transmitting coil 802 so that the camera head 102 will emit a readily locatable frequency, such as 512 Hz, for use in determining the underground location of the camera head 102. This can occur during a pipe inspection operation utilizing a man-portable locator of the type disclosed in U.S. Pat. No. 7,009,399, for example. The coil 802 substantially surrounds the camera module 600. The core 804 is preferably formed from Metglas® 2714A annealed alloy tape rolled into a tubular configuration that also surrounds the camera module 600. The housing 806 of the sonde is preferably made of a material of low conductivity and low magnetic permeability to minimize eddy current losses and avoid shunting the field. When powered under the control of a circuit mounted on the camera circuit board 424, the sonde emits a 512 Hz frequency, for example. The integrated sonde allow the axial length of the coil 802 to be minimized while still providing adequate radiated signal strength for underground locating operations.

Figure 8:
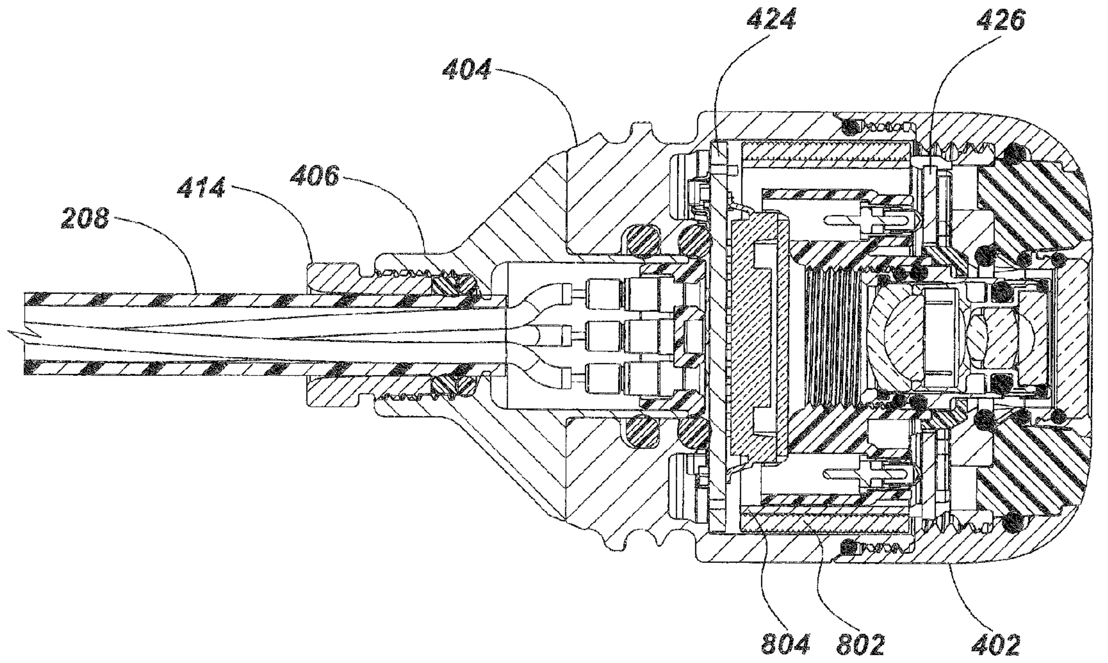
FIG. 8 is a section view of an alternative embodiment of the camera head illustrating a built-in sonde transmitter.

FIG. 8 further illustrates the manner in which the central core 208 of the push-cable 104 enters the sealing screw 414 and the connector shell 406, that are attached to the housing 404. The relative positions of camera circuit board 424, the LED circuit board 426 and the bezel 402 are also illustrated in FIG. 8.

In the preferred embodiment of the pipe inspection system 100 a pipe guide 900 (FIGS. 9A and 9B) surrounds the camera head 102 (FIG. 3) and is used in conjunction with the coil spring 304 to center the camera head 102 within the pipe 110 (FIG. 1) as it travels down the pipe 110. The pipe guide 900 positions the camera head 102 away from the wall of the pipe 110 and to keeps it free from obfuscating sludge. As best seen in FIG. 9A the pipe guide 900 comprises two halves. One half includes three parts 902, 906 and 910. The other half includes three parts 904, 908 and 912 which are mirror images, identical in shape to their counterparts in the other half of the pipe guide 900. Left shell 902 and right shell 904 are identically formed of molded polypropylene or similar material. Snap lock 906 is fitted to the lower surface of the left shell 902 and is mirrored by identical snap lock 908 fitted to the upper surface of right shell 904. Slide lock 910 on the upper surface of left shell 902 is mirrored by identical slide lock 912 on the lower surface of shell 904.

FIG. 9B illustrates the left half of the pipe guide 900 completely assembled. It includes left shell 902, left snap lock 906, and left slide lock 910. The assembled right half of the pipe guide 900 comprises shell 904, snap lock 908, and slide lock 912. The two halves of the pipe guide 900 snap-fit together when the respective snap lock and slide lock pieces are correctly aligned and mated. Grooves are provided in the vanes of the left and right shell pieces 902, 904, and partial cut-outs are formed into the surfaces of the segments between the vanes such that the snap-lock and slide-lock parts will fit through.

FIG. 9C illustrates the two halves of the pipe guide 900 snap-fitted together. When assembled each slide lock 910 and 912 will show a small tab on either side of a vane. The ends of the slide locks are anchored in openings at the base of one vane, passing through an opening at the base of the next vane, and anchored with its tabs protruding on either side of a third vane. The pipe guide 900 may also be mounted around the coil spring 304. The slide locks are shaped with a curved form and will slide down into the coil spring 304 when the protruding tab is depressed, the curved tab-end snapping under the edge of the cutout well in the vane, and the lower edge of the lock engaging the coils of the coil spring 304. The center vane in the set of three is saddled by one of the snap locks, such as 908, seated in a cutout in the center vane. When the slide lock 910 is depressed, engaging the coil spring 304, the snap-lock 908 may be slid in its groove until its edge blocks the snap lock from disengaging accidentally, by preventing the edge of the slide lock from rising above the curved surface of the paired shells. The assembled pipe guide 900 can be slid over the coil spring 304 (FIG. 3) until positioned as desired. The slide lock 910 is then depressed and engages the coil spring 304, and the snap lock such as 908 is then closed to lock the slide lock 910 into position. Two slide locks such as 910 and 912 are engaged for each half of the pipe guide 900, and locked by the associated snap locks 908 and 906 respectively. One or more pipe guides 900 may locked onto the coil spring 304 in this manner and serve to keep the camera head 102 off the bottom wall of the pipe 110 where sludge and water accumulate.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A push-cable, comprising:
a central core including a plurality of conductors;
a plurality of non-metallic resilient flexible stiffness members surrounding the core;
a layer of sheathing surrounding the stiffness members; and
a removably attachable termination adaptor that couples to a stiff portion of the push-cable and permits the conductors to be operatively connected to a camera head.

2. The push-cable of claim 1 wherein the central core includes a plurality of insulated wires.

3. The push-cable of claim 2, further including a camera head coupled to the plurality of insulated wires.

4. The push-cable of claim 3, further including a pipe guide configured to guide the camera head within a pipe or other cavity.

5. The push-cable of claim 3, further including a sonde.

6. The push-cable of claim 1 wherein the stiffness members are rods.

7. The push-cable of claim 6 wherein the rods are made of fiberglass.

8. The push-cable of claim 6 wherein the rods are made of carbon fiber.

9. The push-cable of claim 6, wherein the sheathing is a flexible braid.

10. The push-cable of claim 9, wherein the one or more conductors comprise a plurality of conductors wrapped around the monofilament.

11. The push-cable of claim 10, wherein the plurality of conductors are helically wound around the monofilament.

12. The push-cable of claim 1 wherein the stiffness members have round cross-section.

13. The push-cable of claim 1 wherein the rods have a pie-shaped cross-section.

14. The push-cable of claim 1 wherein the rods have a rectangular cross-section.

15. The push-cable of claim 1 wherein the stiffness members are helically wrapped around the central core.

16. The push-cable of claim 15, wherein the lay length of the helically wrapped stiffness members is approximately six inches or less.

17. The push-cable of claim 15, wherein the lay length of the helically wrapped stiffness members is greater than six inches.

18. The push-cable of claim 1 wherein the central core includes a polymer member about which the conductor is helically wrapped.

19. The push-cable of claim 1, wherein the central core comprises a monofilament.

20. The push-cable of claim 1, further including a camera termination assembly configured to couple the conductors to the camera head.

21. The push-cable of claim 1, further including a spring-loaded pin assembly configured to allow the one or more conductors to electrically couple with a camera head.

22. An inspection apparatus, comprising:
a camera head;
a resilient flexible push-cable, coupled to the camera head, the push-cable having a central core including a plurality of conductors;
a coil spring disposed about a distal end of the push-cable in proximity to the camera head; and
a removably attachable termination adaptor that couples to a stiff portion of the push-cable and permits ones of the plurality of conductors to be operatively connected to corresponding contact devices of the camera head.

23. The inspection apparatus of claim 22, wherein the termination adapter comprises:
a press shell seated around the push-cable;
a spring shell secured to the press shell; and
a ferrule, having a taper, seated around the central core;
wherein the plurality of conductors pass directly through the spring shell and press shell.

24. A camera head for a pipe inspection system, comprising:
an outer housing having a transparent window; and
a camera module mounted within the housing behind the window including a camera circuit board including a plurality of contact devices for making direct removable connections with a plurality of conductors of a resilient flexible push-cable, wherein the plurality of contact devices comprise contact pads configured to align with ones of a plurality of contacts electrically coupled to the plurality of conductors of the resilient flexible push-cable.

25. The camera head of claim 24, wherein the plurality of contact devices comprise contact pads that align with ones of a plurality of push-pins coupled to the plurality of conductors of the resilient flexible push-cable.

26. The camera head of claim 24, wherein the housing includes a bezel configured to be coupled at a forward end of the housing and a plurality of light emitting diodes (LEDs) mounted in the bezel.

27. The camera head of claim 26, wherein the bezel is a screw-on bezel.

28. The camera head of claim 27, wherein the LEDs are mounted to an LED circuit board, the LED circuit board including annular contact areas to provide electrical connections to the LEDs.

29. A pipe inspection system, comprising:
a camera head;
a resilient flexible push-cable, coupled to the camera head, the push-cable having a central core including a plurality of conductors and a plurality of fiberglass rods helically wrapped around the core;
a coil spring disposed about a distal end of the push-cable in proximity to the camera head; and
a removably attachable termination adaptor that couples to a stiff portion of the push-cable and permits ones of the plurality of conductors to be operatively connected to corresponding contact devices of the camera head.

* * * * *